A. P. MORROW.
BACK PEDALING COASTER BRAKE.
APPLICATION FILED MAR. 29, 1907.
906,260.
Patented Dec. 8, 1908.
FIG. 1.
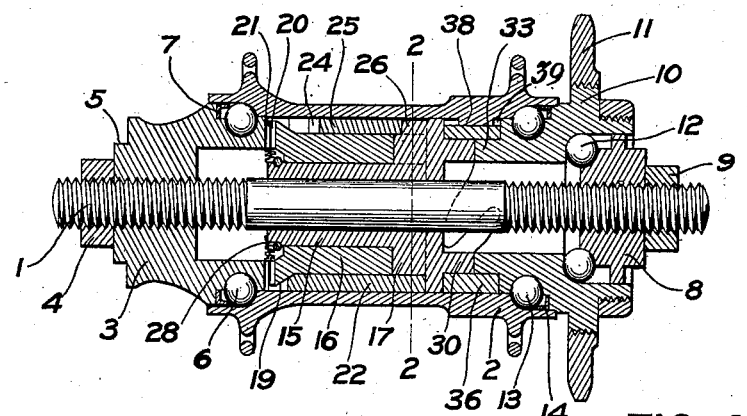
FIG. 2.
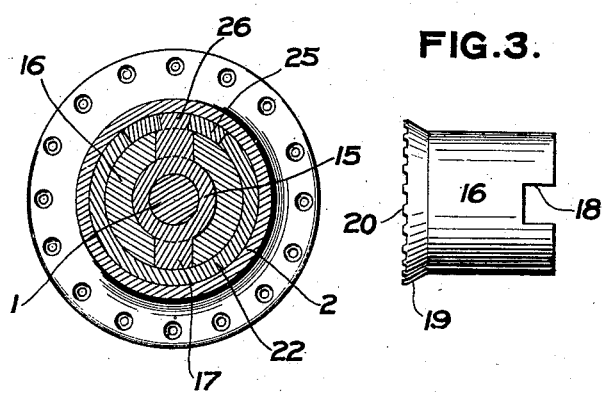
FIG. 3.
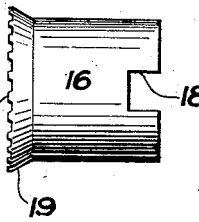
FIG. 4.
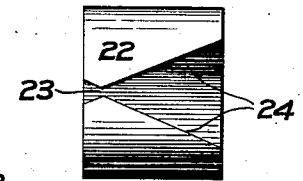
FIG. 5.
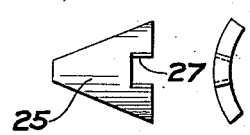
FIG. 6.
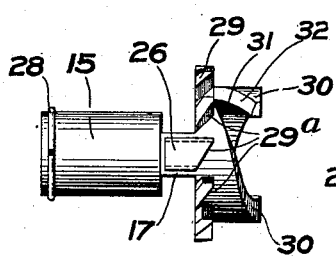
FIG. 7. FIG. 8. FIG. 9.
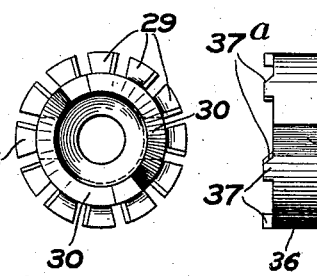
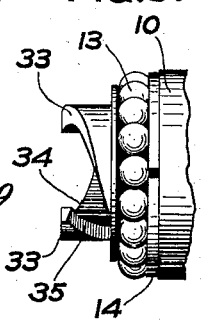
WITNESSES:
Clarence W. Carroll
D. Gurnee
INVENTOR:
Alexander P. Morrow
by Osgood & Davis
his attorneys

UNITED STATES PATENT OFFICE.

ALEXANDER P. MORROW, OF ELMIRA, NEW YORK.

BACK-PEDALING COASTER-BRAKE.

No. 906,260.  Specification of Letters Patent.  Patented Dec. 8, 1908.

Application filed March 29, 1907. Serial No. 365,409.

*To all whom it may concern:*

Be it known that I, ALEXANDER P. MORROW, a citizen of the United States, and resident of Elmira, in the county of Chemung and State of New York, have invented certain new and useful Improvements in Back-Pedaling Coaster-Brakes, of which the following is a specification.

This invention relates to back pedaling coaster brakes, and has for its object the production of a device with few parts, in which simplicity and strength are combined to a high degree.

In the drawings: Figure 1 is a longitudinal vertical section; Fig. 2 is a transverse section on the line 2—2 of Fig. 1; Fig. 3 is an elevation of the brake block; Fig. 4 is an elevation of the brake sleeve; Fig. 5 is a side and end view of the brake wedge; Fig. 6 is a side elevation of the clutch sleeve; Fig. 7 is an end elevation of the same; Fig. 8 is a side elevation of the clutch ring; and Fig. 9 is a partial elevation of the driver.

The driving and braking parts are carried upon a shaft or axle 1, and are inclosed by a hub 2 of the usual form. A block or collar 3 is held stationary upon the shaft 1 by means of the nut 4, and a projection 5 which engages the usual notch in the rear fork of a bicycle frame. Ball bearings 6, which serve to support one end of the hub 2, are retained in a raceway in the block 3 by means of a compressible split ring 7, of L-shaped section. On the opposite end of the shaft is a cone 8, locked in place by a nut 9. The driving member 10, to which is fixed the sprocket 11, is partially supported on ball-bearings 12. Another set of balls 13 are held in place by a retaining ring 14 on the driver (Fig. 9), and said balls carry one end of the hub 2, the opposite end of which is supported upon the balls 6 as aforesaid.

Supported within the hub, upon the shaft 1, is a sleeve 15, which extends through the brake block 16, and a square lug 17 thereon engages a notch 18 in the end of said block. At the opposite end of the block 16 is a conical enlargement 19, on the inner face of which are serrations 20, adapted to engage similar serrations 21 on the collar 3, and thereby to hold said block stationary.

Between the brake block and the hub is the brake sleeve, which consists of a ring 22, split at 23, the slot being widened toward the right hand end to form acutely-beveled faces 24. A wedge 25 lies between said faces, and is retained in place by a lug 26, extending outward from the top of the lug 17, and engaging a notch 27 in said wedge. The side faces of the lug 26 are beveled, and the sides of the notch 27 are shaped correspondingly. These engaging parts are beveled in order that the wedge may be retained in place when the braking and clutch members are removed from the hub. A wire ring 28 lies in a groove surrounding the sleeve 15. When this ring is removed from its groove, the brake block 16, the brake sleeve 22, and the wedge 25 may be slipped off the said sleeve and separated. When the ring is in place, these parts are removable with the sleeve 15, as one single member.

At the right hand end of the sleeve 15 are a number of ratchet teeth 29, whose engaging faces are at right angles to the plane of rotation. Two wedge-shaped hooks 30, semicircular in form, project from the outer side of the ratchet teeth 29. At the highest portion of each wedge a notch 31 is cut. The inner face 32 of said semicircular hooks forms an acute angle with the outer face of said wedge. Similar wedge-shaped hooks 33 are formed on the inner end of the driver 10 that also have notches 34 and acutely-inclined faces 35 adjacent thereto. In the normal position of the parts shown in Fig. 1, the inclined faces 32 and 35 of said wedges 30 and 33, respectively, are in contact.

A ring 36, having projections 37 on one end (Fig. 8) encircles the hook 30, in such a position that the projections 37 will be engaged by the ratchet teeth 29 when the latter rotate forwardly. On the inside of the hub 2 is a lug 38, which enters a groove 39 in the ring 36, causing the latter always to revolve with the hub. Thus the ring 36 is movable lengthwise of the hub, but is revoluble with the hub.

Upon forward rotation of the driving member 10, the faces 35 slide upon the corresponding faces 32 of the clutch, and the resulting cam action of these curved wedges draws the sleeve 15 and the parts integral therewith, toward the sprocket end of the hub. These faces 35 and 32 have a rapid pitch that causes the clutch parts to move rapidly into the clutched position for driving, and to release instantly when the pedals are held stationary or reversed. The rapid pitch of the faces 35 and 32 does not produce a powerful action, but power is not required to move the sleeve 15 and its connected parts. The ratchet teeth 29 now engage with the projections 37 on the ring 36, and the latter is revolved, carrying with it the hub 2, to which it is practically locked by the lug 38. In thus driving the hub, there is no endwise thrust on the balls 13, as in previous devices of this character. The reason for this is that the ring 36 rests between the block 10 (the driving member) and the side faces of the projecting teeth 29 on the sleeve 15, and is not clamped between said parts. Most clutch devices throw pressure on the bearings that increases their friction, and tends to wear them out. Upon stopping the driving member 10, the hub 2 turns under its momentum, and the ring 36 travels with it, while the other parts remain stationary. The beveled sides 37ᵃ of the projections 37 act as cams upon the beveled sides 29ᵃ of the ratchet teeth 29, and the latter, together with the brake block 16, the brake sleeve 22, and the wedge 25, are forced to the left, leaving the ring 36 free to revolve with the hub.

To apply the brake, the driver is rotated backwardly in the usual manner. The wedges 33 then act as cams against the wedges 30, forcing the clutch sleeve 15 and the parts attached thereto, toward the left. The inner faces of the ratchet teeth 29 bear against the end of the brake sleeve 22, and cause the latter to move to the left, carrying with it the brake block 16. When the serrations 20 on said brake block engage the corresponding serrations 21 on the collar 3, said block will be held stationary. On further movement of the clutch sleeve 15, the brake sleeve 22 will be expanded by the conical surface 19 of the block 16. The lug 26 also forces the wedge 25 against the faces 24 of the brake sleeve, and the latter is thus expanded throughout its length against the inside of the hub 2. Note that the cam faces of the hooks 33 and 30 that are used for applying the brake are long and of slow pitch in order to secure power for the brake. On forward rotation of the driver, after the brake is thus set, the ratchet teeth 29 will immediately be moved away from the end of the brake sleeve 22. The latter is then free to contract and release itself from the hub, the contractile force being sufficient to move the wedge 25 out of the tapered split 23. The wire ring 28 also strikes the end of the brake block 16, and the latter is immediately freed from the collar or stationary block 3.

The parts cannot jam for the reason that the ends of the hooks freely enter their respective sockets, at no time contacting on both sides. Furthermore, the driven part 15 is impelled by a direct and positive push of the hook on the end of the socket that it enters, instead of a friction drive as is usual.

It will be noted that in this form of brake the braking members revolve with the hub in forward pedaling, and are at rest when coasting. The brake block wedge and sleeve must always rotate or remain stationary with the clutch sleeve, by reason of their engagement with the lugs 17 and 26, and therefore also move whenever the driving member 10 moves.

No spring retarder is required in this brake, the incline of the wedges 30 and 33 being so gradual that no rotation of the braking parts ensues on back pedaling. Furthermore, the weight of these parts is such that more effort is necessary to revolve them than to move them longitudinally along the shaft.

What I claim is:—

1. In a back pedaling brake for cycles, a driving member; a hub; an expansible brake-shoe, having a wedge-shaped slot, that widens toward the driver; a brake actuator having a lug; a wedge adapted to enter the wedge shaped slot in said brake shoe to expand it, and having a slot adapted to receive the lug on the brake actuator; means for holding said brake shoe against rotation on back pedaling; and means operated by the driving member for shifting said brake actuator longitudinally.

2. In a back pedaling brake for cycles, a driving member; a hub; a stationary block adapted to be attached to the frame of the cycle, and having a clutch member; an expansible brake shoe, having a wedge-shaped slot that widens toward the driving member; a brake carrier having a clutch member adapted to engage the clutch on the stationary block and a recess; a brake actuator adapted to enter said carrier, and having a lug that rests in said recess; a wedge adapted to enter the wedge-shaped slot in said brake shoe to expand it, and having a slot adapted to receive the lug on the brake actuator; means operated by the driving member on back pedaling for moving said brake carrier into engagement with said stationary block, and for forcing said wedge into said brake shoe.

3. In a back pedaling brake for cycles, a driving member; a hub; a stationary block adapted to be attached to the frame of the cycle, and having a brake clutch member; a brake carrier, revoluble with said driving member, having a clutch member adapted to engage the clutch member on the stationary block, and a conical enlargement adjacent thereto; an expansible brake sleeve upon said carrier, non-rotative, and longitudinally movable with reference thereto; and means operated by the driving member on back pedaling to move said brake carrier into engagement with said stationary block, and said brake shoe upon the conical surface of said carrier.

ALEXANDER P. MORROW.

Witnesses:
MARGARET NAGLE,
GEORGE F. SMITH.